US009836747B2

(12) United States Patent
Borrero

(10) Patent No.: US 9,836,747 B2
(45) Date of Patent: Dec. 5, 2017

(54) SYSTEM AND METHOD FOR SHOPPING GOODS, VIRTUALIZING A PERSONALIZED STOREFRONT

(76) Inventor: Simon Borrero, Fort Lauderdale, FL (US)

( * ) Notice: Subject to any disclaimer, the term of this patent is extended or adjusted under 35 U.S.C. 154(b) by 175 days.

(21) Appl. No.: 13/415,088

(22) Filed: Mar. 8, 2012

(65) Prior Publication Data

US 2012/0330781 A1 Dec. 27, 2012

Related U.S. Application Data

(60) Provisional application No. 61/499,342, filed on Jun. 21, 2011.

(51) Int. Cl.
*G06Q 30/06* (2012.01)
*G06Q 30/00* (2012.01)

(52) U.S. Cl.
CPC .................................... *G06Q 30/00* (2013.01)

(58) Field of Classification Search
CPC .... G06T 15/00; G06Q 30/0641; G06Q 30/06; G06Q 30/0633
USPC ................................ 705/26.1, 26.8; 345/419
See application file for complete search history.

(56) References Cited

U.S. PATENT DOCUMENTS 7,685,023 B1 * 3/2010 Abraham et al. ............ 705/27.2
2002/0169665 A1 * 11/2002 Hughes ................ G06Q 10/087 705/14.1
2003/0132298 A1 * 7/2003 Swartz ................... G06K 17/00 235/472.02
2003/0171944 A1 * 9/2003 Fine ....................... G06Q 50/22 705/2
2004/0153371 A1 * 8/2004 Razumov ........... G06Q 30/0643 705/27.2
2006/0064347 A1 * 3/2006 Robinson ........... G06Q 30/0222 705/14.37
2006/0122917 A1 * 6/2006 Lokuge et al. ................. 705/27
2007/0288296 A1 * 12/2007 Lewis .................... G06Q 30/02 186/52
2008/0043013 A1 * 2/2008 Gruttadauria .......... G06Q 30/02 345/419
2010/0241525 A1 * 9/2010 Aguera y Arcas ..... G06F 3/011 705/26.1
2010/0299182 A1 * 11/2010 Eivaz ...................... G06F 3/011 705/7.32

* cited by examiner

*Primary Examiner* — Mila Airapetian
(74) *Attorney, Agent, or Firm* — Richards Patent Law P.C.

(57) ABSTRACT

A shopper-tailored virtual model of a physical storefront where items are located in a configuration specific to customer preferences, and a single virtual model corresponds to a different shopper, with said product arrangement continuously improving with the shopper's history of purchases, is achieved through an intuitive user interface of a mobile computing devise. The user experience is designed to invite shoppers to browse through the storefront planograms with a fast paced passing motion, intuitive picking and throwing of products within the basket, buy full recipes and added search features, it allows for speedy yet large purchases. The system's social capabilities enables shoppers to create, suggest and share recipes with specific ingredients available in the retailer stores, with the added value of having said recipes delivered to the shopper's desired location.

12 Claims, 13 Drawing Sheets

SYSTEM AND METHOD FOR SHOPPING GOODS, VIRTUALIZING A PERSONALIZED STOREFRONT

CROSS-REFERENCES TO RELATED APPLICATIONS

This application claims the benefit of U.S. provisional patent application Ser. No. 61/499,342, filed by the same inventor on Jun. 21, 2011, the entire teachings of which are incorporated herein by reference.

REFERENCES CITED

| U.S. Pat. No. | |
|---|---|
| 76,381,583 | April 2002 |
| 6,434,530 | August 2002 |
| 7,188,081 | March 2007 |
| 7,606,736 | October 2009 |
| 7,634,429 | December 2009 |
| 7,873,543 | January 2011 |
| 6,304,855 | October 2001 |
| 7,440,903 | October 2008 |
| 7,685,023 | March 2010 |
| 7,885,865 | February 2011 |
| 2005/0071257 | March 2005 |
| 2010/0070361 | March 2010 |
| 2010/0217681 | August 2010 |

BACKGROUND OF THE INVENTION

The present invention relates to the field of e-commerce, and particularly to improving the online shopping experience, allowing shoppers to personally or collectively purchase goods from remote locations in an intuitive manner which is suited to their buying habits.

Many people find purchasing online is stressful due to continuous search operations and waiting time. Improved internet connections has sped up online shopping, yet most shoppers still find the process stressful due to the little responsiveness and long periods they must wait for item pictures and pages to load.

Currently, purchasing processes online require that the costumer browse through several menus and perform lengthy browsing operations. Most websites and mobile applications devised for online shopping employ the same model for selling books online as they do for selling groceries and other items that people are familiar with and therefore require little additional information. This model is inadequate for fast recurrent purchases of products shoppers know or for which they require little additional information, and demands too much work from them.

Online retailers have made attempts to reduce the amount of time necessary for buying groceries by allowing shoppers to save lists. This solution is limited in the sense that it offers shoppers who buy using their pre-saved lists, little incentive to browse for new products and incur in impulsive purchases.

Several retailers offer suggestions and cross selling of items online that help arouse shoppers' interest and sales, yet a proper virtualization of a storefront that leverages retailers' product placement know how and simultaneously takes advantage of intuitive browsing, seamlessly suggesting products for shoppers specifically interested in said items is yet to be developed.

Looking to provide online shoppers a more pleasant experience, there have been some attempts to virtualize stores; replicating aisles and even linking Avatars to online shopper, in an attempt to replicate the experience of visiting the store. Nevertheless, this approach is not only impractical, as it fails to optimize grocery shopping, but it fails to provide added value to the many shoppers who do not enjoy visiting the store mainly because they feel the activity takes too long. Three dimensional models of stores and aisles are inadequate as well, for they arise from the premise that current store's product dispositions are the best solution for shoppers and retailers. Nevertheless, packed shelves with identical items taking up a large portion of displays and requiring costumers to walk through several identical products, frequently stopping them from considering the vast product offering is not the best approach. Virtually walking through a store is an improvement on truly walking through a real store, but it still stresses some shoppers due to waiting periods and the time not spent analyzing products.

Some shoppers, who do not enjoy visiting the store or don't have time, are now offered the alternative of online shopping through their portable devices. Nevertheless, recurrent shopping such as grocery shopping through these devices has not taken off due to the speed and navigation arrangement proposed by retailers. Some retailers believe shoppers have grown accustomed to the unintuitive online purchasing model that requires navigating through several menus, which combined slow internet connection amount to a poor purchasing experience.

Acknowledging the needs of shoppers who continue to feel that buying online requires too much work, and visiting the store does as well, there is an opportunity for new and intuitive, shopping experience, that interests shoppers with a relevant offering of products and uncluttered aisles, that requires no previous experience shopping online, and makes shopping time very quick while allowing impulsive purchases.

SUMMARY OF THE INVENTION

The present invention discloses a system and method for an enhanced online grocery shopping experience where an optimized virtualization of a storefront and aisles is accessed by the shopper from his home or a remote location, through a portable device with networking capabilities. Through the system's intuitive interface the shopper browses through an environment that resembles that of storefront but with a clean planogram allowing him to visualize all products quickly, and with an offering of easily accessible items that may tailor particular shopper's demographic and purchase history among other variables. The shoppers move through aisles, picks and places items in a basket, in an intuitive, similar fashion to actual grocery shopping. No time is spent virtually 'walking' through the store, as shoppers are constantly 'facing' aisles, and therefore better using time effectively shopping. Also, the system's social networking features enable shoppers to individually and collectively create, suggest and share recipes or lists with specific ingredients available in the retailer stores. Shoppers can therefore collectively plan an event, buy the necessary items by dividing the bill evenly or unevenly, and have the items delivered to the desired location.

DETAILED DESCRIPTION OF THE INVENTION

The description of the invention in this application hereby incorporates by reference, in its entirety, U.S. Provisional Patent Application No. 61/499,342, Filing Date Jun. 21, 2011; 'System and Method for Shopping Packaged Goods, Virtualizing a Personalized Storefront.'

Referring now to the invention in more detail, the following description will address the shopping experience, interactions between shoppers using the system, system configuration as well as store personalization.

Enhanced Shopping Experience.

Figure 1:
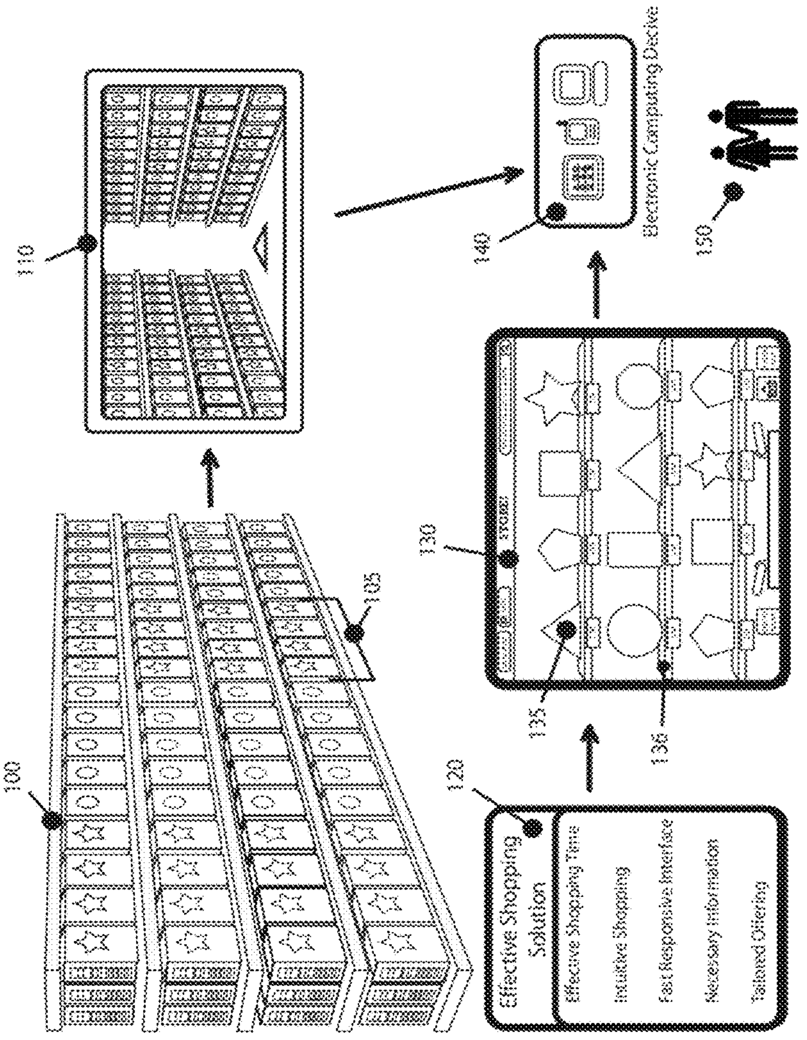
FIG. 1 Schematic diagram of an enhanced storefront and shopping interface, in accordance with an embodiment of the inventive arrangements disclosed herein.

FIG. 1 depicts a schematic drawing of a virtual solution for an enhanced remote shopping experience. The solution entails superior storefront virtualization in two dimensions 130 which displays products 135 in a clean arrangement of uncluttered shelves 136 resembling store aisles, while providing sufficient information for shoppers to purchase items, over a screen on a portable electronic computing device. Shoppers can utilize computing electronic devices 140 with networking capabilities to shop from remote locations and have the desired purchase delivered by retailers, suppliers, logistics operator and the like, to a designated location. In one embodiment, different shoppers 150 can see, through particular interfaces, different storefront virtualizations and planogram arrangements for the same retailer. These tailored storefronts and product offerings can be defined in whole or in part by the retailer organization in a centralized server, and in whole or in part by software present in the shopper's portable electronic device, tailoring product offering, product location, prices and the like, in response to input such as demographic micro segmentation, previously purchased items, inventory, weather conditions and the like.

The disclosed solution contrasts with regular store aisles 100, typically packed with products, which sometimes overwhelm some shoppers. Additionally, the disclosed solution enables fast browsing items by avoiding planograms where the exact same product may have several contiguous spots on shelves 105, obliging shoppers to walk through several identical products they may not want to purchase in order to reach those they are interested in. Virtual stores containing three dimensional aisles 110 and products, and planograms, portrayed in a manner which closely resembles a real store continue to inconvenience shoppers who want to shop quickly and not wonder through several products and aisles. The solution presented here in, allows for shoppers to consistently 'face' aisles through the interface. A shopper will not waste time virtually 'walking' through three dimensional representations of aisles, significantly increasing the effective time shopping.

Figure 2:
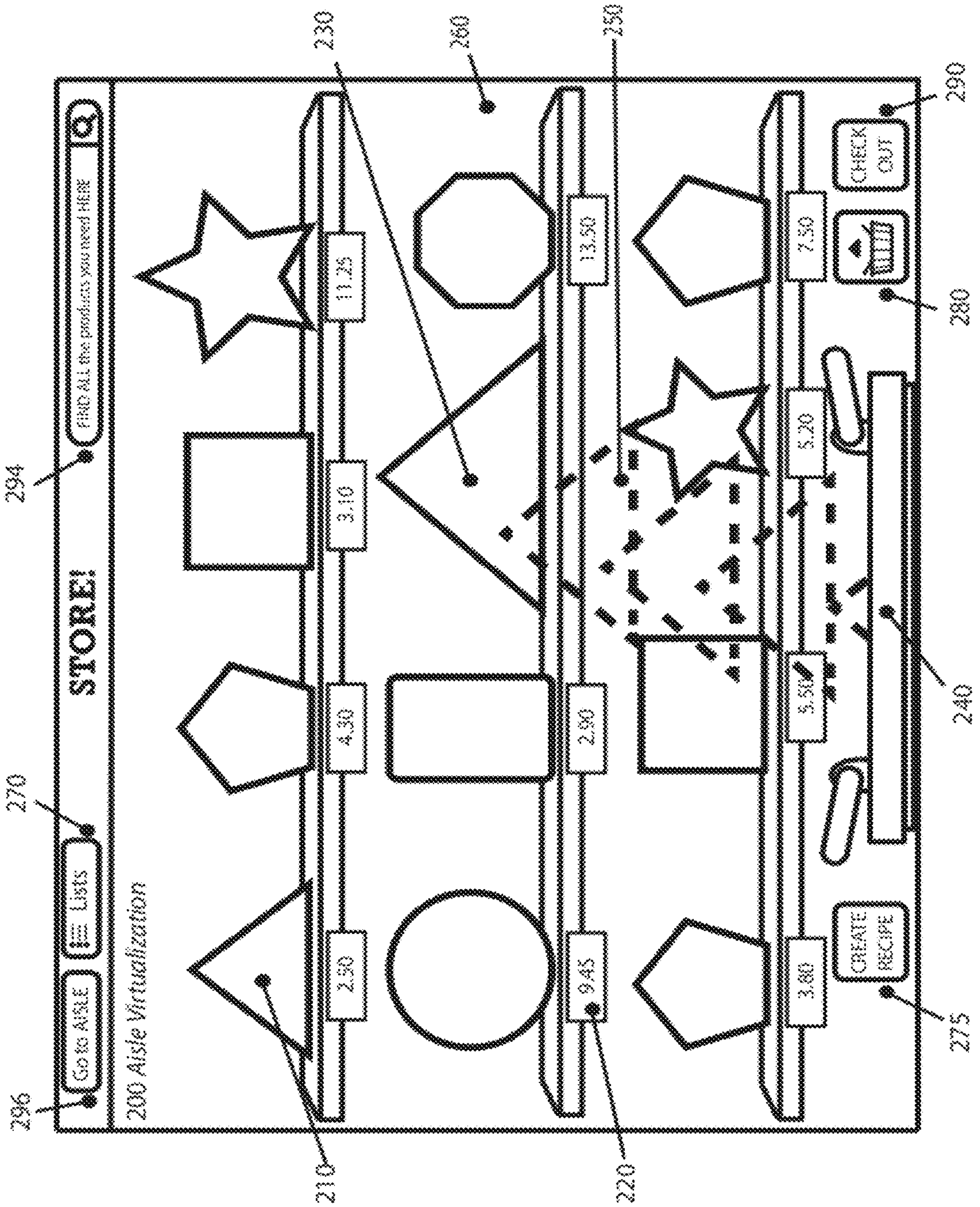
FIG. 2 Schematic diagram of enhanced shopping experience, in accordance with an embodiment of the inventive arrangements disclosed herein.

FIG. 2 depicts one embodiment of the system interface that allows for an enhanced shopping experience as disclosed in the present invention. Products 210 within a store aisle 200 can be represented in interface mimicking the storefront. The interface can be supported by a portable electronic device with an input that can take the form of a mouse, keyboard or touchscreen. Items 210 are located in clean aisle layout 200, where prices 220 and discounts can be portrayed under every item. Movable displays, non-movable displays and the like can also be represented in the interface.

In one embodiment, consisting of an interface supported by a display with touchscreen capabilities, to select an item for purchase, a shopper need only touch said item 230, and intuitively throw it into the basket 240. In addition to seeing the product cross the screen enter the basket 250, the shopper can receive some form of immediate confirmation of the fact that the desired item was thrown in the basket such as a sound, vibration, image or animation, significantly speeding up the purchasing process. Considering the previous embodiment with touchscreen capabilities, the shopper can quickly move through aisles by touching the lateral edge of the screen 260 with one finger and moving said finger horizontally in the opposite direction without removing it from the screen, similarly to flicking through magazine pages. The shopper can access previously saved lists or recipes 270 and create new lists or recipes 275 from the items previously thrown in the basket. After selecting the desired items, the shopper can select the 'basket' button 280, or a similar button provided to allow selection of such functionality, to review the purchase and select a 'check out' button 290, or a similar button provided to allow selection of such functionality, to proceed to payment options. The disclosed invention can be configured to present any number of products in aisles, and shortcuts to different aisles can be accessed selecting the 'Go to Aisle' button 292, or a similar button provided to allow selection of such functionality. In one embodiment, products typically present in a convenience store, roughly twelve hundred, can be presented in aisles similar to that portrayed in FIG. 2. The full product offering can be accessible through the search feature 294, where products found through search results can be presented in shelves as well.

Figure 3:
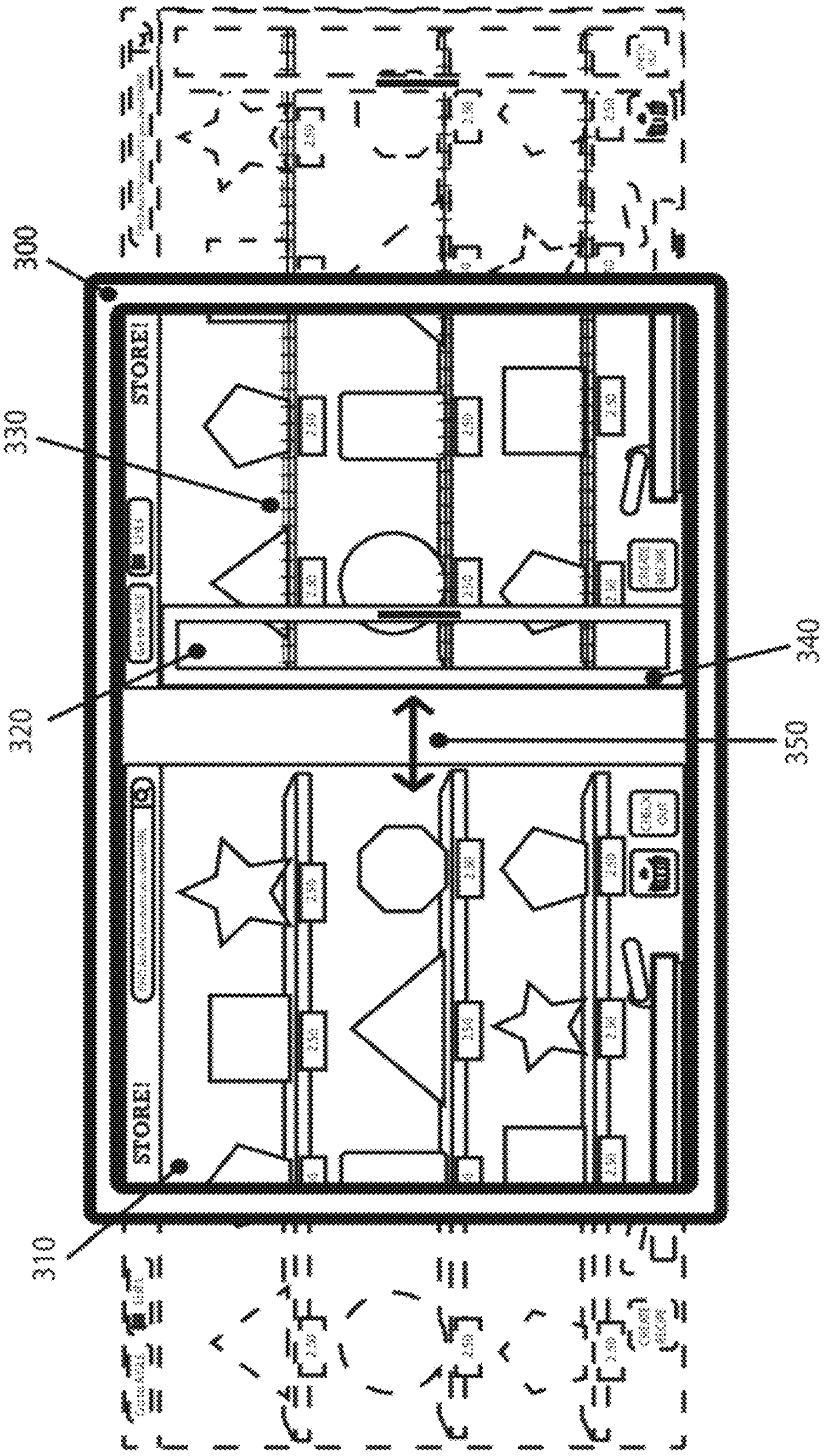
FIG. 3 Schematic diagram of intuitive aisle browsing, in accordance with an embodiment of the inventive arrangements disclosed herein.

To use the search feature, a shopper would need only input keywords related to the desired products, through a keyboard or voice, for example lactose free milk, soy sauce and the like, or utilize advanced searching filters that can include but with no limitation price, quantity, origin, and/or categories such as sugar-free, lactose intolerant, vegetarian and the like. In one embodiment, the images and data pertaining to a segment of the full offering of products can be initially downloaded into the shopper's portable device, allowing for a very fast and responsive interface because the devise would not rely on a fast internet connection for the shopper to log onto the web to view these products through interface or add them to the basket. Additional thousands of products could be stored in a data base in a retailer server, and accessed through internet. In another embodiment, the images and data pertaining to the full product offering of a large retailer, roughly fifty thousand items, can be downloaded into a portable device, hence requiring the costumer to access the internet only to update prices or complete payment. In another embodiment, FIG. 3 depicts a schematic representation of the motion of passing through aisle sections and aisles as is viewed by a shopper through the interface of a portable computing device 300. A shopper can quickly browse through sections within an aisle 300 and quickly transition into a different aisle such as cold goods section or freezer 320. This transition is fast as the shoppers sight is consistently fixed on different aisles, reducing the time required to virtually walk from aisle to aisle, significantly increasing the rate of effective shopping time. Different aisles can consider different shelve configurations, in FIG. 3 exemplified with wire shelves 330 typical in cold aisle sections representations of moving and non-moving entities within the aisle section such as the refrigerator door 340 exemplified in FIG. 3. The aisle arrangement and ambiance presented through the interface of the disclosed invention can resemble specific sections of actual stores such as but in not limited to bakery, fruits, vegetable, meats, canned goods and the like or entirely hypothetical aisle sections that entail moving and non-moving items and displays.

Figure 4:
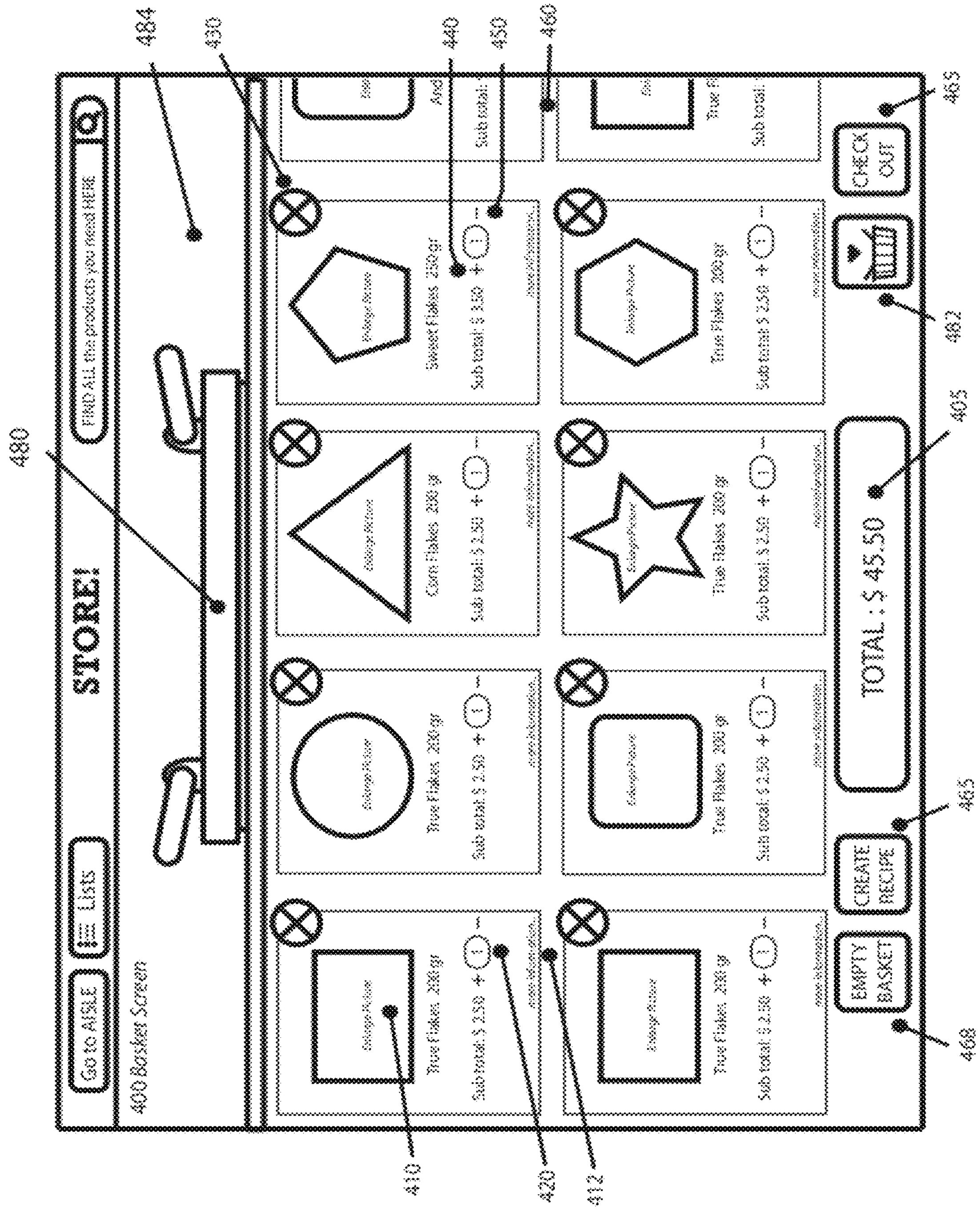
FIG. 4 Schematic diagram of shopping basket, in accordance with an embodiment of the inventive arrangements disclosed herein.

FIG. 4 depicts a schematic representation of basket functionalities in the basket screen 400 displayed through interface, as disclosed in the present invention. In one embodiment with touchscreen capabilities, the shopper can edit the selected items present in the basket and verify current purchase value 405. Additional information for each item in the basket can be accessed by touching the item itself 410 or selecting the 'more information' button 412, or a similar button provided to allow selection of such functionality. Items can be deleted 430, increased 440 or decreased 450 in number. The basket can be emptied as well by selecting the 'empty basket' button 468. The shopper can move through the items present in the basket in the same fashion as that for moving from aisle to aisle described in FIG. 2, which expedites the verification and editing of the basket content, as well as the purchasing process. The shopper can leave the basket screen 400 to continue purchasing through the aisle arrangement or search feature by touching the basket 480, selecting the basket button 482, or a similar button provided to allow selection of such functionality, or touching anywhere in the interface outside the basket area 484. The shopper can also create a recipe with the ingredients contained in the basket by selecting 'create recipe' button or proceed to pay for the purchase by selecting the 'check-out' option.

Figure 5:
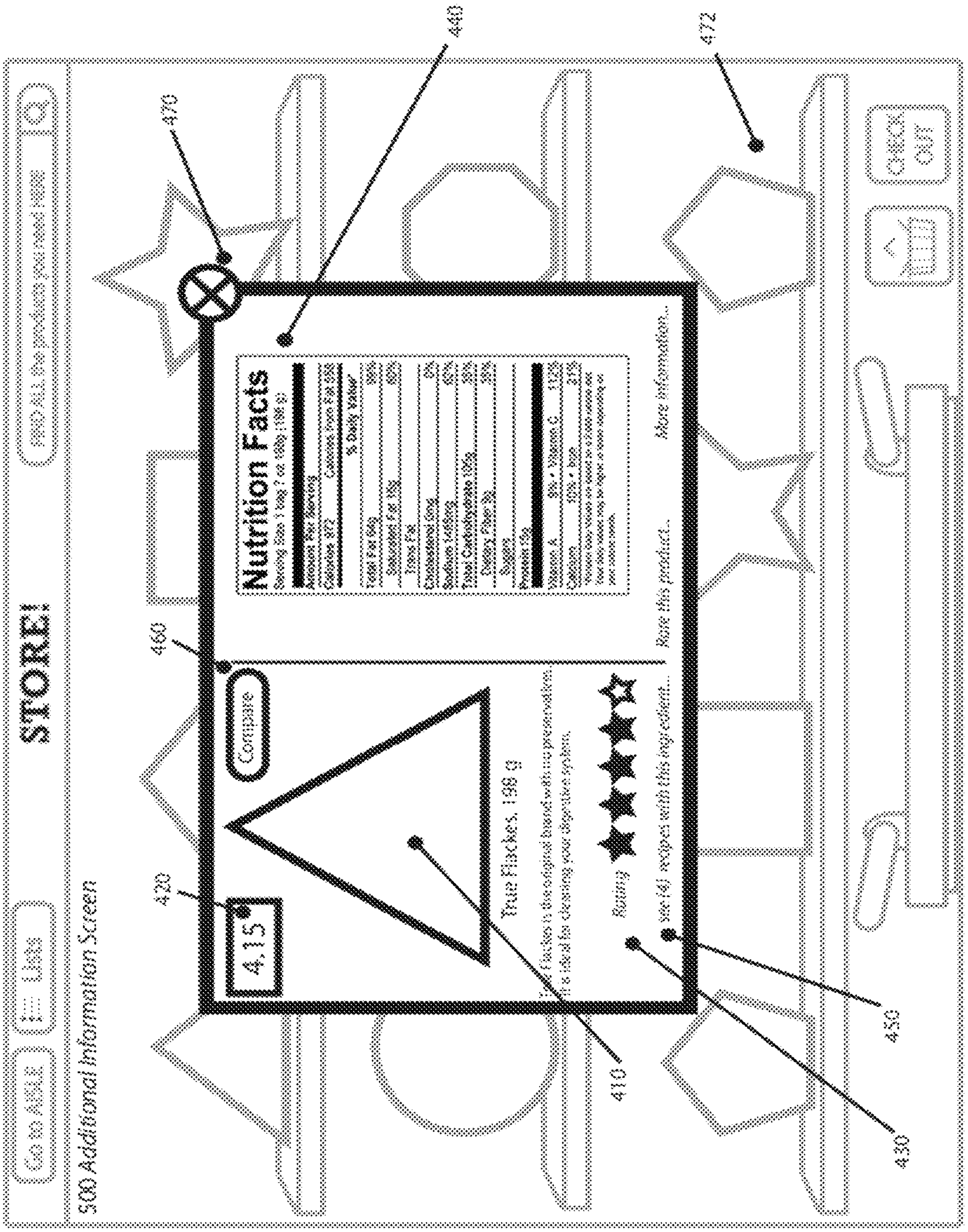
FIG. 5 Schematic diagram of additional information, in accordance with an embodiment of the inventive arrangements disclosed herein.

FIG. 5 depicts a schematic diagram of the additional product information screen 500, available for shoppers to perform fast yet knowledgeable purchases. Shoppers can visualize through the interface relevant information such as but not limited to a larger size picture 410, price 420, rating 430, and nutrition facts 440. Retailers can stimulate sales through suggested recipes feature 450 which can present several recipes that use the viewed product as an ingredient and may entice the shopper to increase the purchase value. Shoppers can also save products for comparison upon deciding which items to buy. To exit this screen the shopper can select the circled 'X' on the top right corner 470 or touch anywhere outside the additional information box.

Figure 6:
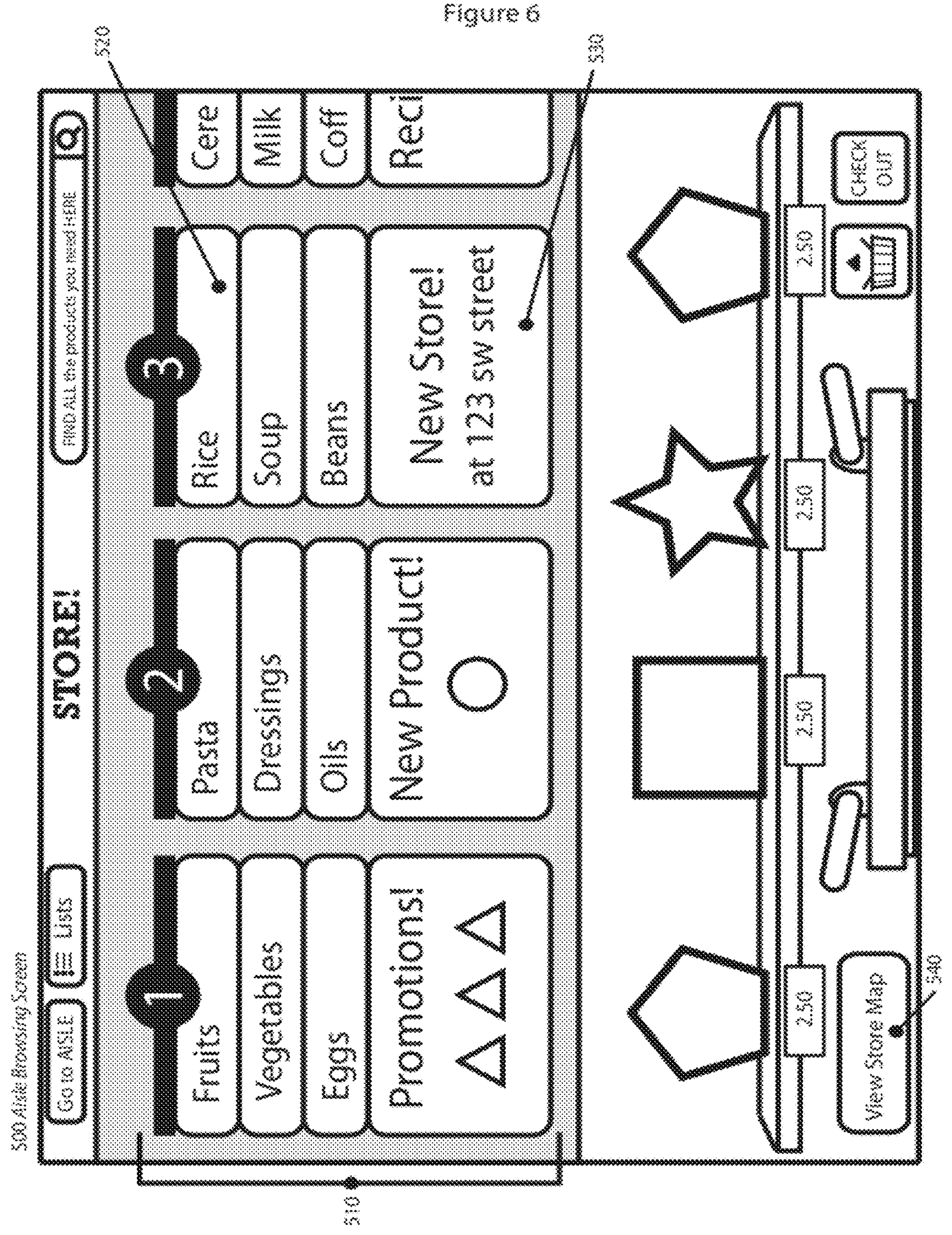
FIG. 6 Schematic diagram of menu browsing in accordance with an embodiment of the inventive arrangements disclosed herein.

FIG. 6 depicts an intuitive aisle browsing menu that may or may not resemble aisle distribution within a true store. In one embodiment, the user can move through headings in a similar fashion to that for moving from aisle to aisle mentioned in paragraph [0003]. Different submenus 520 can be accessed by selecting them and spaces within the menus 530 can be assigned to promotions, product advertising, service advertising and the like. In one embodiment that closely mimics a true store; some shoppers may prefer using a top view or map of the said store's aisles, which can be accessed by selecting the 'View Store Map' button 540, or a similar button provided to allow selection of such functionality.

Figure 7:
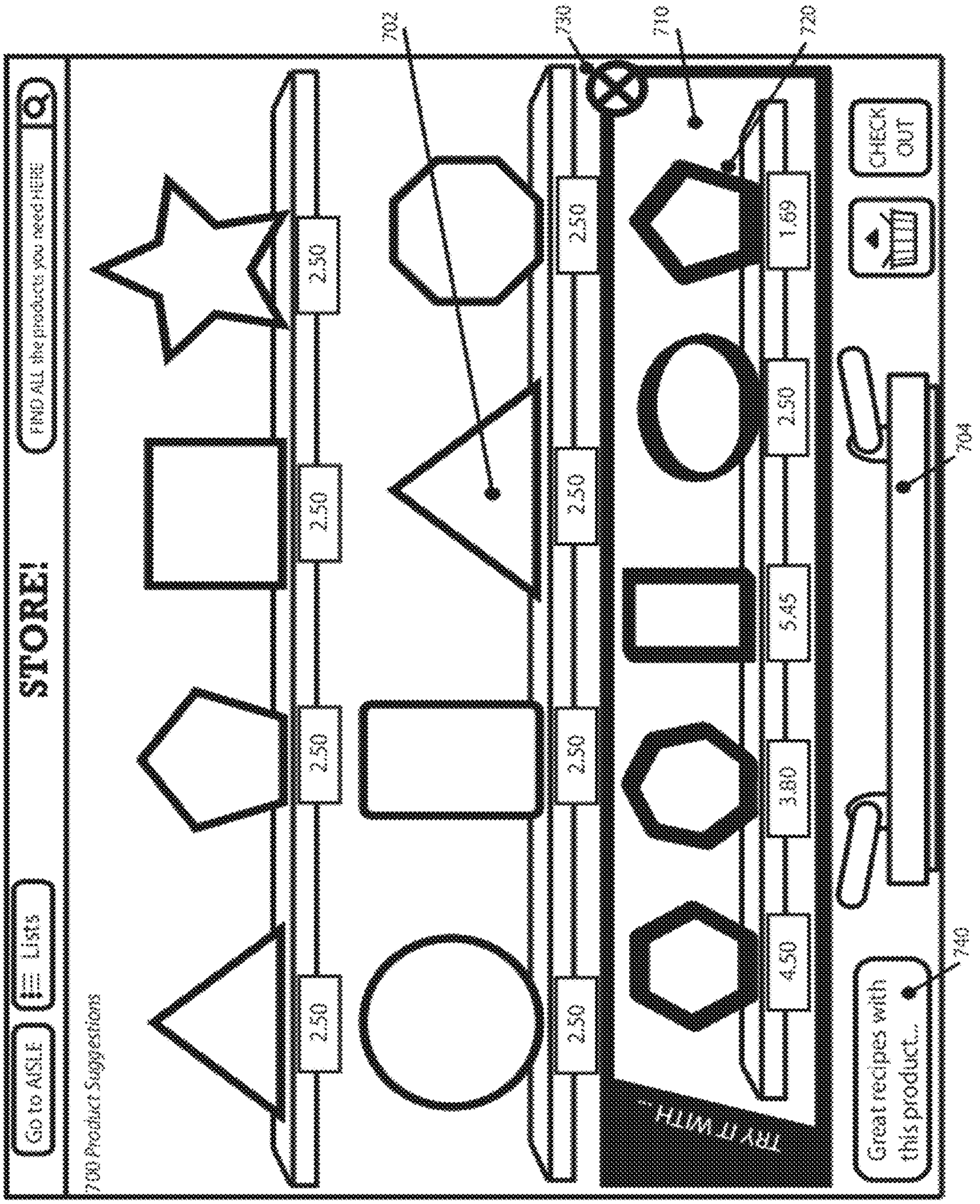
FIG. 7 Schematic diagram of impulse purchase stimuli, in accordance with an embodiment of the inventive arrangements disclosed herein.

FIG. 7 depicts a suggested products box 710, one of the forms of impulse buy stimuli that the disclosed invention provides retailers with as a tool to increase sales. For selected items regularly bought coupled with other items, the shopper can be presented with suggestions of other products frequently consumed in the same occasion. For example, product 702 can be a cereal, regularly consumed during a breakfast meal. After the shopper throws said product into the basket 704, the suggestion dialog box can be displayed in the screen portraying other products the shopper may also consume during breakfast such as bananas 720, orange juice, yogurt and the like. These suggestions can be tailored for the shopper by taking into consideration variables that can include but with no limitations demographics, previous purchases, geographic location, weather conditions in the shopper's area and the like. In one embodiment, The shopper can close the suggestion box 710 by selecting the 'X' 730 located on the top right corner or anywhere outside the suggestion box. Additional forms of impulse purchase stimuli may include but are not limited to products on sale, discount coupons, and discounts coupled to purchasing additional products. The shopper can also access recipes that use the product 702 recently thrown in the basket 704 by selecting the 'Great Recipes with . . . ' button 740 or a similar button provided to allow selection of such functionality. In one embodiment, the shopper may opt for disabling any of the cross-selling suggestion features in order to produce a less invasive shopping experience.

Figure 8:
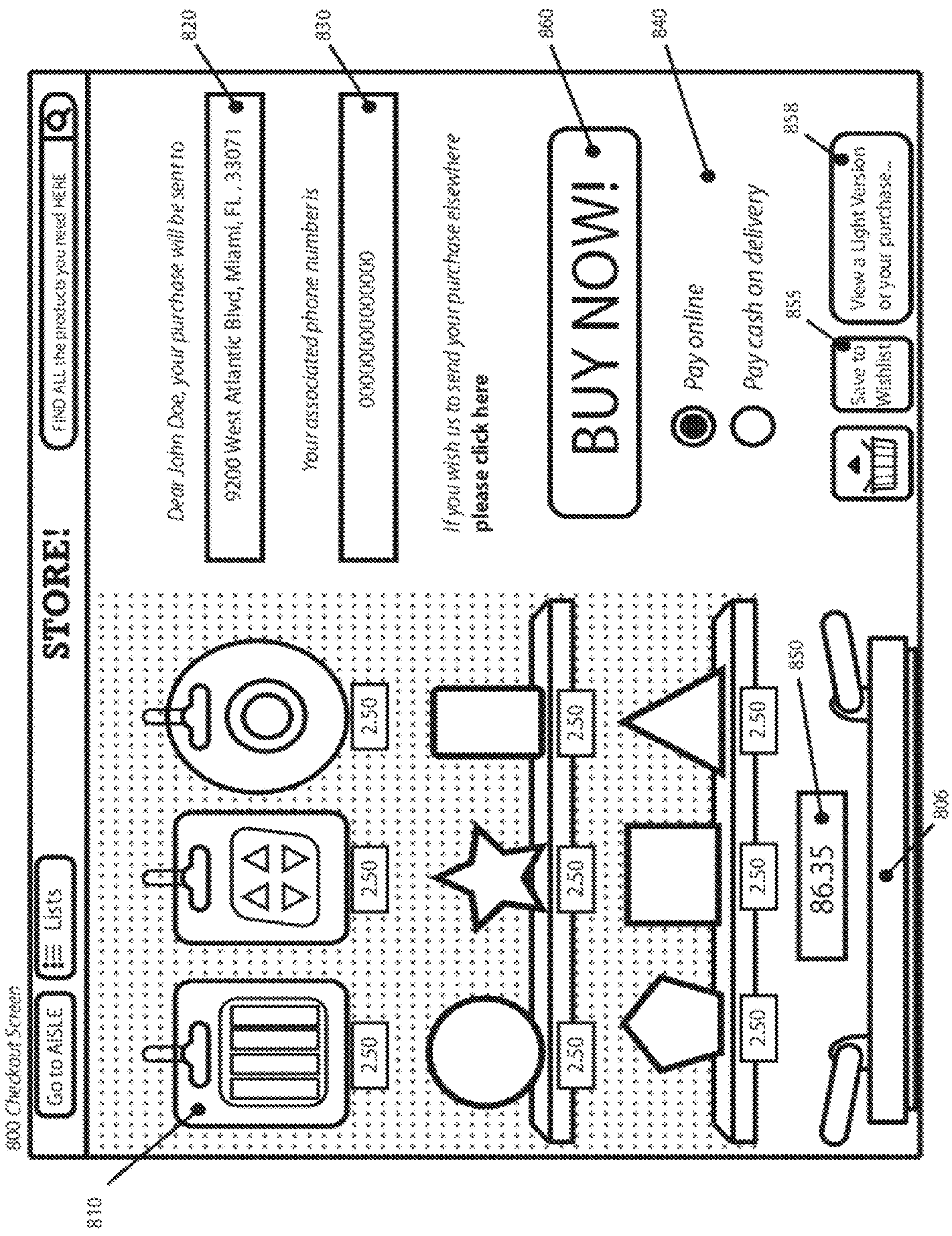
FIG. 8 Schematic diagram of check out screen, in accordance with an embodiment of the inventive arrangements disclosed herein.

FIG. 8 depicts a schematic drawing of one form of a checkout screen that can be displayed in interface as disclosed in the present invention. The shopper can be presented with an ambiance that closely resembles the area next to a cash register in a typical store, where last impulsive buys can be stimulated by presenting high rotation products 810, items on sale and the like. In one embodiment, the interface can include fields where the shopper can verify and edit the address where the desired purchase is to be delivered 820 and a phone number for verification purposes 830. In another implementation, the shopper can select the desired store where the purchase would be available for pickup and the time it is to be picked up. Several purchasing methods can be implemented 840 and FIG. 8 depicts online payment and cash payment upon delivery, but should in no way limit other payment options that can be implemented through the system. Through the disclosed arrangement, shoppers can also review the total purchase value 850 and access the basket 806 to verify items previously selected for purchase. Additional functionalities that can be embodied in the disclosed invention can include but are not limited to addition of current purchase to a wish list 855, suggestion of a low caloric content version of the product selection 858 and/or the like. The shopper can also select the 'buy now' or a similar button provided to allow selection of such functionality button, to complete the payment.

Figure 9:
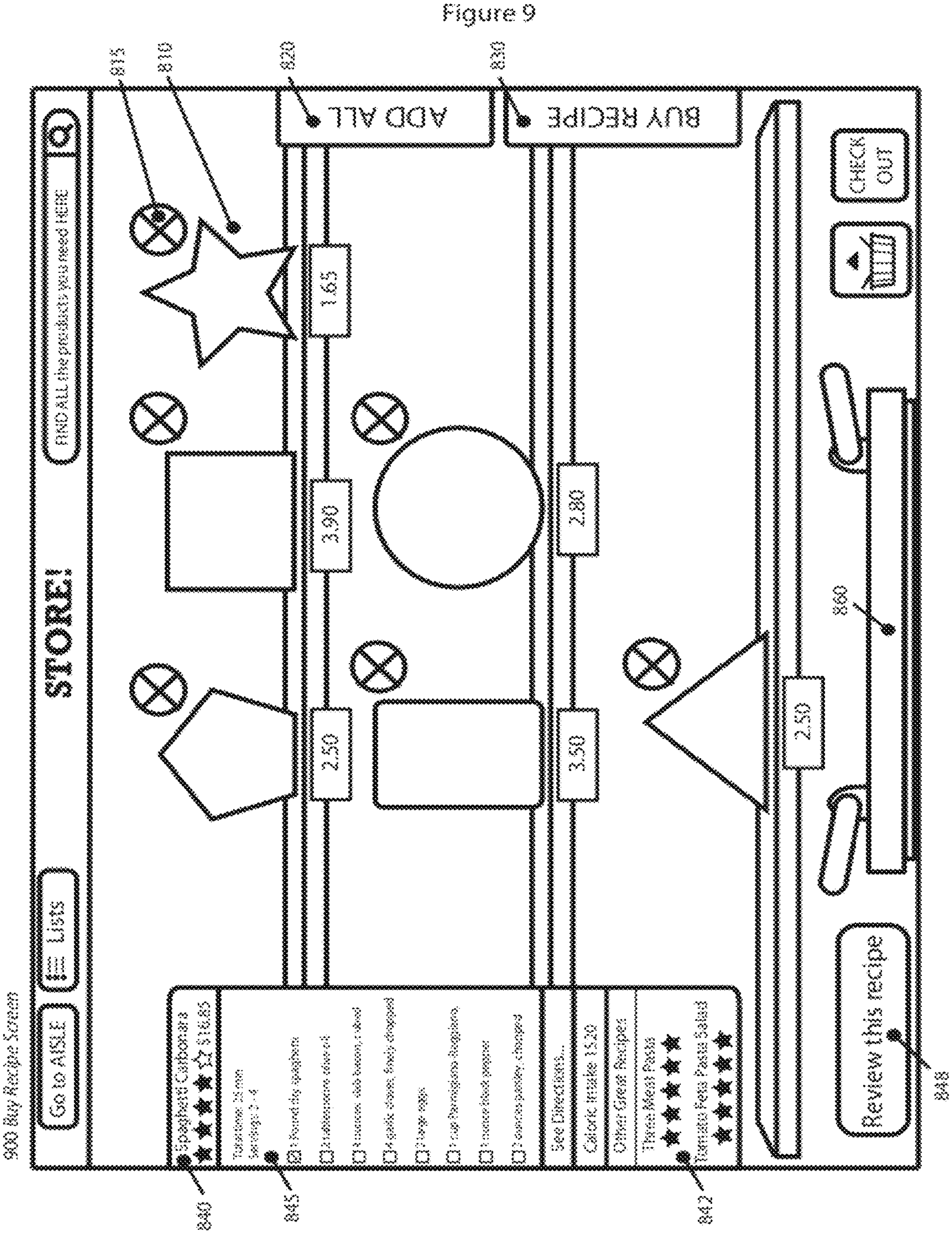
FIG. 9 Schematic diagram of list and recipe-purchasing screen, in accordance with an embodiment of the inventive arrangements disclosed herein.

FIG. 9 portrays one embodiment of an aisle arrangement for a shopper list or recipe through interface. Shoppers can select recipes for purchase, quickly review the products 810 necessary to complete said recipe, eliminate products that may not be needed, selecting the 'X' on the top right corner of each product 815, add all products simultaneously into the basket 806 selecting the 'add all' button 820, or a similar button provided to allow selection of such functionality, or immediately buy the recipe with the 'buy recipe' button 830, or a similar button provided to allow selection of such functionality. In one embodiment, the shopper can see information pertinent to performing an informed purchase, including but not limited to title, rating and price 840, caloric intake, cooking instructions, other similar recipes 842, and the like. In one embodiment, the shopper can view a list or recipe in text format 845, quickly select items by selecting checkboxes, and save a list or recipe for future purchase. After consuming the recipe and products, the shopper may wish to review 848 the recipe to provided added information for other future shoppers.

Figure 10:
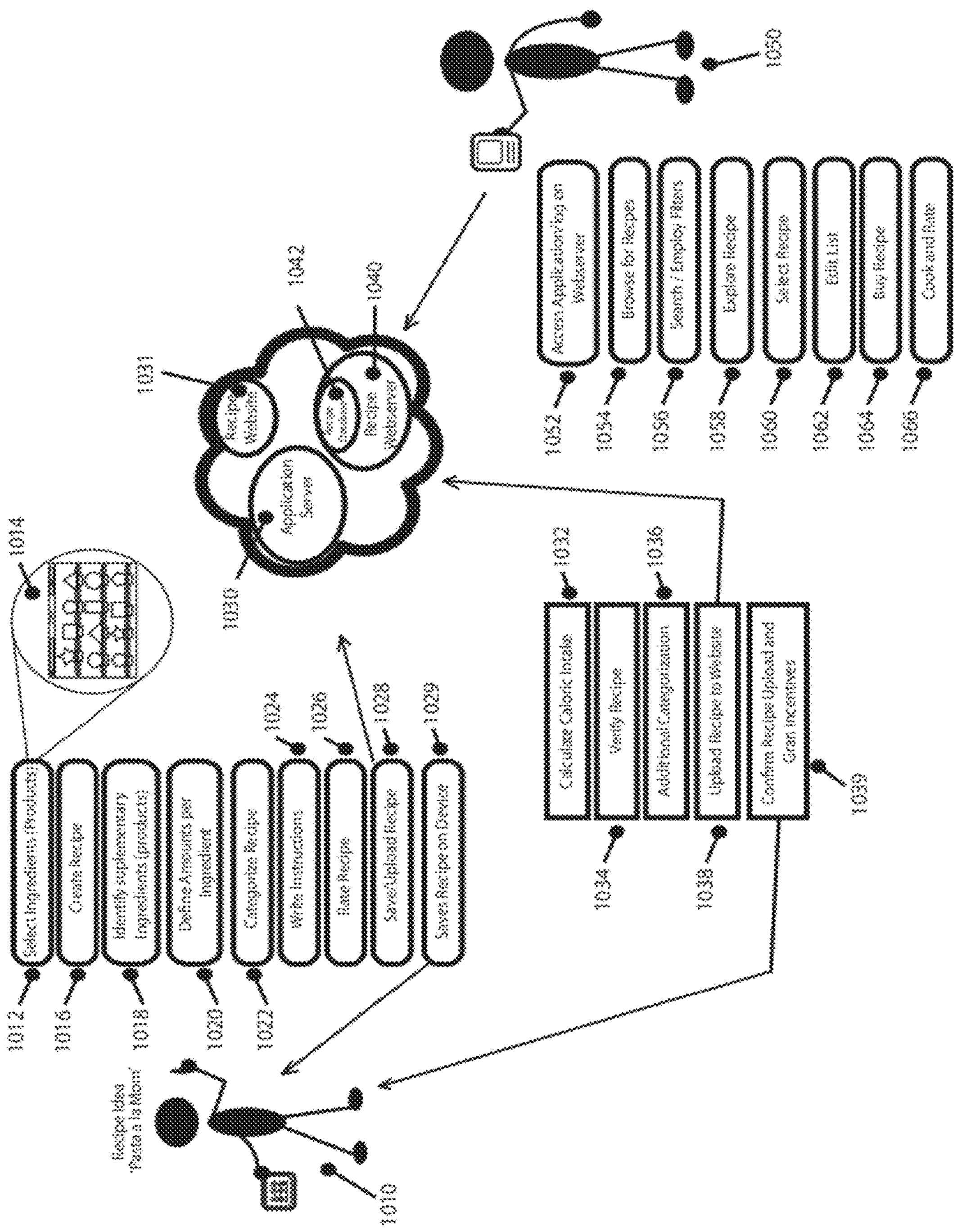
FIG. 10 Schematic diagram of method for creating and purchasing lists and recipes, in accordance with an embodiment of the inventive arrangements disclosed herein.

The disclosed invention allows users to create, edit, buy and rate recipes that can be shared openly to other fellow shoppers, through the system server and social networks. Users can also keep their recipes private, and/or share them with a select group of users through the system and social networks. FIG. 10 depicts the process according to one embodiment by which a shopper can 1010 to create a recipe and make it public through the system, as well as the process required for a second shopper 1050 to buy that recipe. In one embodiment, where the first shopper accesses the system through the interface in a portable device with networking and touchscreen capabilities, the shopper creating the recipe, hereafter named 'chef' 1010, selects and throws in the basket 1012 the products or ingredients. This process takes place in a similar fashion to that of a regular purchase through the system, through an interface where items can be located through a search feature and by browsing through aisles 1014 as those described in FIG. 2. The chef can select the 'create recipe' button, or a similar button provided to allow selection of such functionality, from the basket described in FIG. 4 to indicate the desire to create a recipe 1016 out of the selected products. The chef can define a title for the recipe, choose the amount of servings for said recipe, and select supplementary products 1018 for those that were initially selected. Some shoppers may prefer a version of a recipe with lower caloric content, and the chef can provide that option, or suggest lest costly alternatives by selecting the mentioned supplementary ingredients. Subsequently, the chef can designate the required amount per ingredient 1020, and categorize the recipe 1022 considering a list that can include but is not limited to lunch, dinner, breakfast, graduation, baby shower, etc., so that the recipe can be easily accessible by other shoppers. The chef can also select the preparation and cooking time, and input the preparation and cooking instructions 1024 and rate the recipe 1026. Finally, the chef save the recipe and upload 1028 it to the system's application server 1030. Some of the operations performed by the application server can include but are not limited to, a caloric intake calculation 1032, and recipe verification 1034, where reasonable limits to price, caloric intake and cooking time are verified to ensure a feasible recipe is uploaded. Additional categorization 1036 performed in the application server can include but without limitation, categorizing by product, which may allow shoppers to search for recipes that use one or any combination of desired products, as well as price, caloric intake and the like. Subsequent to verification and categorization, the application server 1030 can upload the recipe to a system recipe webserver 1040 and saved in a recipe database 1042, to which a shopper 1050 can connect through a portable device in order to purchase hosted recipes. Once the recipe is uploaded to the system recipe webserver 1040, the application server can send the chef confirmation that the recipe was successfully uploaded 1039, that may entail but is not limited to an email or pop-up text.

A Shopper may desire to plan a special meal or a party for ten people. Through the system this shopper can access the recipe webserver 1052 through a portable device and browse for recipes 1054 using menus or visualizing dishes or categories such as dinner, party, brunch, placed in shelves in a similar fashion to that exemplified in FIG. 2. The shopper can also employ search features 1056 that can include but are not limited to, cooking time, price, and/or the like. A shopper can explore interesting recipes save them for future purchases to a wish list. By selecting a recipe, the shopper can verify the list of products contained in such recipe in an aisle arrangement that may be similar to that described in FIG. 2. Once a recipe is selected 1060, the shopper can edit said recipe 1062 to be purchased by add more products, or eliminate those that may not require at the moment to cook the recipe. The shopper can later buy the recipe 1064, using the 'buy all' feature or 'buy recipe' feature, cook, rate and comment said recipe. In one embodiment, recipes can be accessed through the internet a recipe website 1031 or shared through social networks and email. Through the recipe sharing and 'buy recipe' feature, shoppers can quickly find recipes or lists necessary to cook family meals, organize social events, and the like, in little time, from remote locations, and potentially the products delivered to a desired location or separated for store pick-up.

Figure 11:
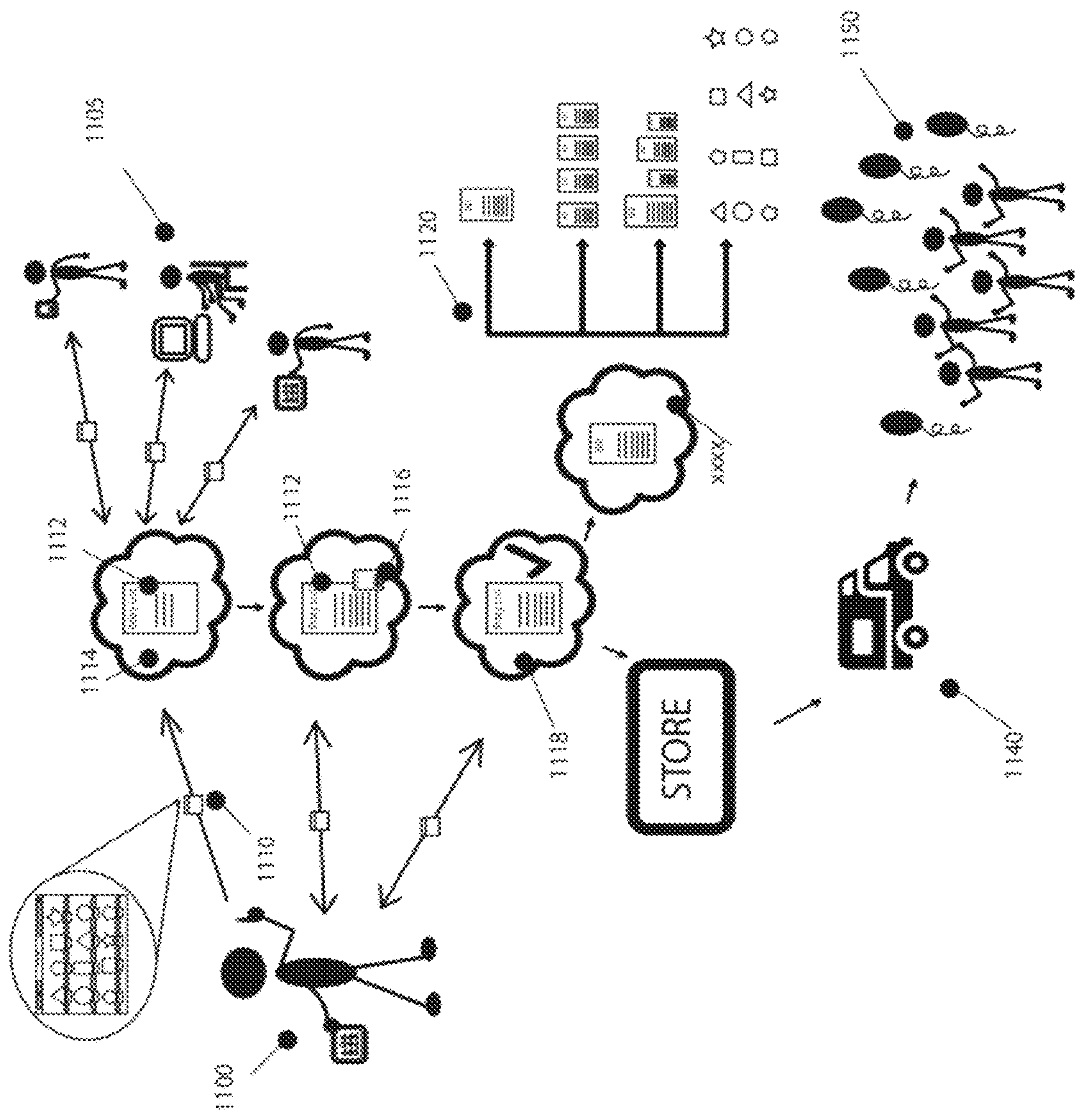
FIG. 11 Schematic diagram of method for collectively creating and purchasing lists, in accordance with an embodiment of the inventive arrangements disclosed herein.

FIG. 11 illustrates a schematic process of one embodiment of the disclosed invention, which allows for collective list or recipe purchase through the system. A shopper, hereafter named team leader 1100 can organize a surprise party, birthday meal and the like, in accordance with a private group of people hereafter called 'friends' 1105. In one embodiment, the team leader can create a list 1112 or recipe through the system interface 1110 using a portable electronic device, in a similar shopping process to that previously described. The team leader can input additional comments and later upload the recipe requesting a key for accessing the recipe. The recipe can be stored in the application webserver, and uploaded to the recipe website 1114, and visible after key verification.

The team leader can share this key via email with friends 1105 pertaining to a private group. In another embodiment shoppers can be assigned usernames and the team leader can make the recipe visible to friends by submitting their usernames. Friends can access the list through the recipe website 1114 or the file can be shared as a data file to be edited in computing devices. Friends can edit the list, suggest changes and comment on the list. These changes can be uploaded to the application server and recipe website 1114. The team leader can latter verify the friend's comments and changes suggested to the list. In one embodiment the team leader would connect a portable device to the website, and the changes can be visible in through interface in the basket screen described in FIG. 4, where deleted items and added items can be highlighted in different colors. In another embodiment, the team leader 1100 can verify, changes including but not limited to edited products and quantities, and friend's comments, through a written 'changes report' 1116. The team leader 1100 can accept the changes 1118 fully, in part, or change nothing in the list, to proceed with purchase. The cost 1120 for said purchase can be arranged in different manners 1122. The bill can be paid by the team leader, it can be divided evenly, unevenly, or specific objects can be assigned to every friend for purchase. After completing payment, the products would be delivered 1140 to a desired location 1150 or available for pickup depending on the implementation defined by the retailer. It is worth noting that group shopping can be implemented to require full or partial agreement among team leader and friends throughout all or part of the process.

Figure 12:
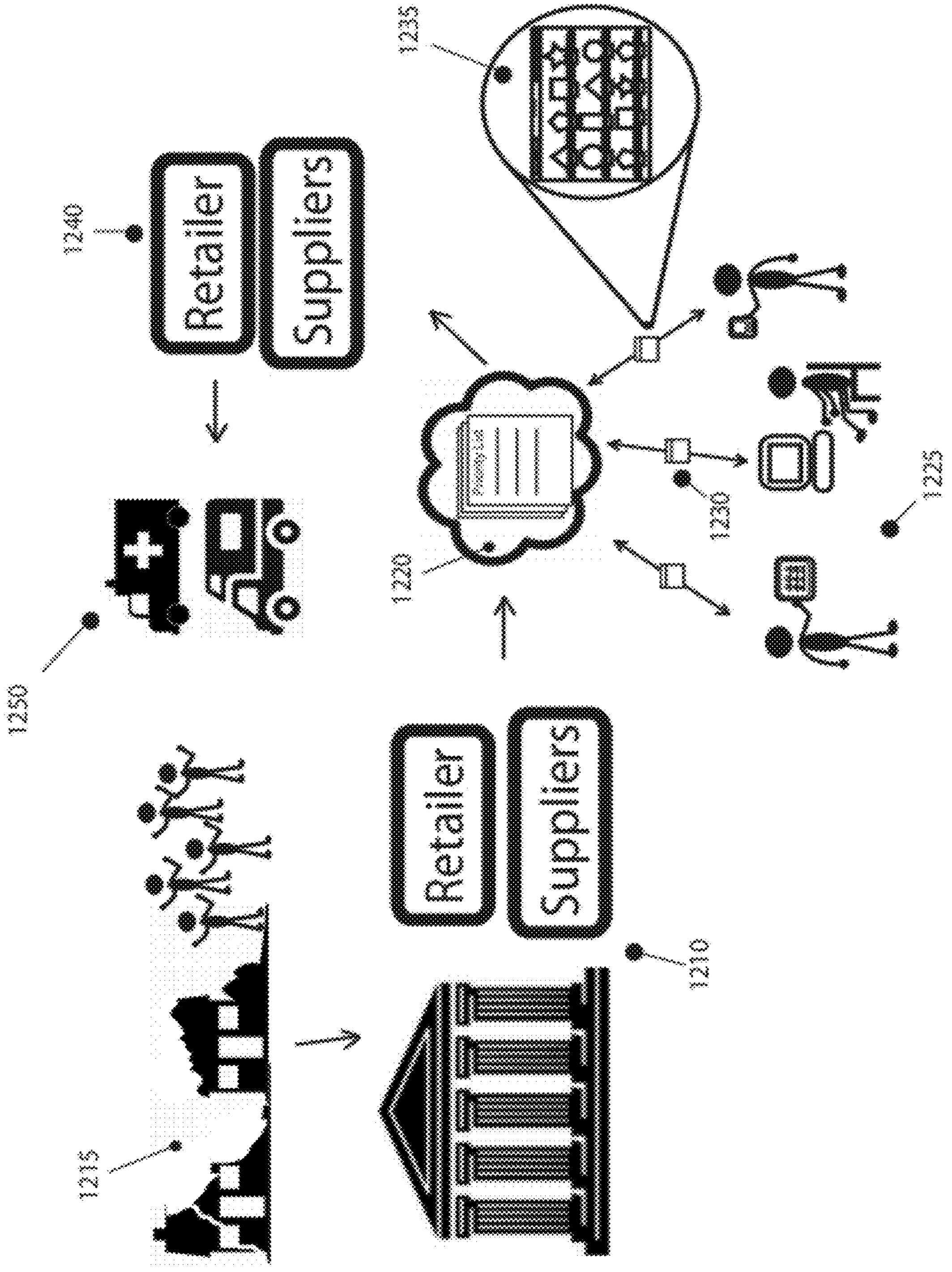
FIG. 12 Schematic diagram of method for performing donations, in accordance with an embodiment of the inventive arrangements disclosed herein.

In another embodiment, the 'buy recipe' or 'buy list' feature can enable submitting donations through the system. FIG. 12, Government agencies or the like 1210 can determine the groceries and other products most needed in areas stricken by disaster 1215, and define several editable or non-editable lists 1220 with different values which shoppers 1230 can buy and donate through the system. Donors can visualize the products to be donated through interface described in FIG. 2, potentially establishing a more personal experience with the donation than if money payments were submitted, potentially increasing the amount of help. In one embodiment, lists and product offerings can be specific to a retailer's inventory available in close proximity to the disaster area, potentially allowing governments, retailers, logistics operators 1240 and the like to quickly transport 1235 the goods in a timely manner, while expanding the potential pool of donors worldwide through the internet.

The disclosed invention, in one embodiment can assign a 'parent' account to a shopper, for example the father in a family, and charge said account for the purchases performed by a 'daughter account', perhaps a daughter who is in college at a distant city. The father can assign a maximum allowable amount to be purchased through 'daughter' accounts, working similarly to credit cards and dependable credit card accounts. This implementation may not necessarily require that the parent possess an account with the retailer, and limits could simply be established to payments via credit card account.

As someone skilled in the art will appreciate, the present invention can take the form of a computer program, system or method. Therefore, this invention can be embodied as a software hosted in any palpable medium having computer code such as but not limited to an electronic or magnetic system, or apparatus. The disclosed invention can also take the form of a combination of hardware and software, generally be referred to as a "system". The computer medium with usable code can include a propagated data signal, and be transmitted using a number of adequate mediums including but not limited to wireline, optical fiber cable, wireless and the like. The computer code usable medium can include, one or more wires, random access memory, read only memory, and a transmission medium such as one supporting internet. In the embodiment of this written in combination of programming languages, including object oriented and procedural programming languages. Said code may be executed entirely on a remote computer, accessed for example through internet connection, partly on a remote computer and partly on the user's portable computer device, or entirely on the user's portable computer device. In one preferred embodiment the software is coded in JavaScript and is used by a shopper on a tablet device, such as but not limited to an iPad tablet computer available from Apple Inc. (Palo Alto, Calif.), wherein the database is residing a remote server with connectivity to a store. Additional programming languages can include but are not limited to Ruby, Python, Lua, Scheme, Lisp, Smalltalk, C#, Haskell, ActionScript, JavaScript, Objective-C, C++, C, and/or other languages. The interphase can be deployed in operating systems, but without limitation, such as Linux, Windows, as well as web standards such as XML, RDF, CORBA, and/or other operating systems.

Figure 13:
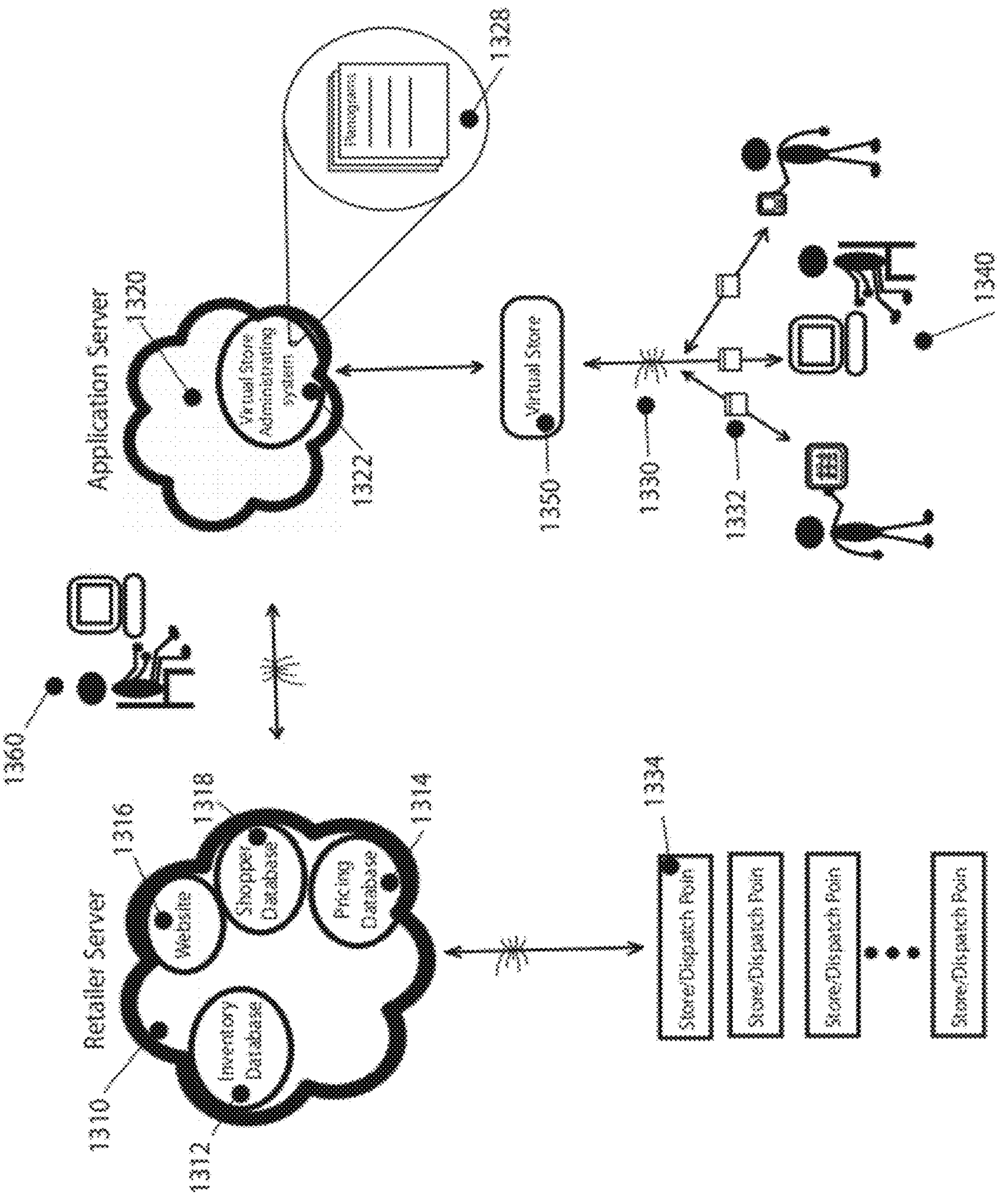
FIG. 13 Virtual store administration and personalization, in accordance with an embodiment of the inventive arrangements disclosed herein.

FIG. 13 illustrates a schematic diagram of one embodiment of the system configuration as disclosed in the proposed invention. A store layout of aisles, products, promotions and the like, of a hypothetical, non-existing physical store can be stored in an application server 1322 through a planogram 1328. An entity responsible for administering retailer planograms can define and store planograms within a virtual store application server 1322, to generate a virtual store 1350 for shoppers 1340 connected over a network 1310. Particular planograms for different shoppers that can consider variables including but not limited to, store available inventory, prices, weather, shopper demographic, purchasing history and the like, and can also be stored in the virtual store application server. Through interface 1332, shoppers 1340 can interact with the virtual store, through an interface connected over a network. An entity responsible for defining virtual store planogram, hereafter named planogram master 1360, can employ a virtual store administration system to generate a planogram for shoppers 1340 to interact with through interface 1332.

Similarly to the arrangement described in FIG. 2, the planogram master can define and input variables that may include but are not limited to aisle ambiance, shelf height and location, product offering and product location, promotions and/or the like, by dragging items into the desired location in interface through keyboard, mouse, and touchscreen or similar. In another embodiment, data pertaining to planograms such as product placement can be input by the planogram master through data file, assigning for example a desired a numeric value to every location within the shopper interface 1332, automating the process of updating planograms. A retailer can host, within a retailer server 1310, information relevant to the operation of a virtual storefront such as an inventory database 1312, pricing database 1314, shopper database, and the like, linking al this information to a website 1316 shoppers can interact with through the internet or another form of network 1330. A large retailer with several hundreds of stores 1334 and dispatch locations can wish to limit the virtual store 1350 product offering visible to shoppers 1340 to include only products which are available in close proximity to the shopper. Portable devices with global positioning systems (GPS) available to portable computing devices such as map location function such as Google Maps provided by Google Inc. (Mountain View, Calif.) can be used to this end. In one embodiment, the planogram master 1360 can prioritize, in the virtual store administration system (VSAS) 1322, the products within a product offering that can be available for shoppers. Through network 1330, the VSAS can link to the retailer server 1310, verify prices, and product inventory for stores and dispatch points connected to the network, registering price variations and inventory limitations, to automatically generate planograms, consistent with restrictions, for every store and dispatch point. Shoppers can access the system through portable computing devices with GPS capabilities where the system can link a particular store to current location and prioritized items within the planogram can be the available virtual store when no restrictions apply, while products of a second priority can replace those which may not be available to in shopper's surrounding. Shoppers can also select the desired store where a purchase would be available for pickup or would be delivered from, and the planogram available for the shopper take this information as input to limit inventory offering.

In another embodiment, a retailer may wish define specific product offering that considers input which may include, but without limitation, shopper demographics, weather conditions in the shopper's immediate area, history of purchase, device operated by the shopper, and/or the like. Planograms can in such case be generated in whole or in part, by software hosted in the application server, retail server or portable device. In one embodiment, items previously purchased by a shopper through the system or in physical stores can be placed in a virtual aisle named for example 'do not forget . . . ' aisle. In one embodiment, through network connection, the shopper can access the application server which can in turn link said shopper's previous purchases. By accessing this information, software present in the shopper's portable computing device, or hosted in the application server, can generate a specific planogram where previously shopped items can be located in one particular aisle, or sparsely located through aisles, inviting the shopper to view all aisles and incur in impulse buys. Items selected by similar shoppers on account of demographics, items and quantities purchased, and the like, could also be associated through the shopper database and used as input to generate a personalized store virtualization. Ultimately every shopper can see a different store which tailored to purchasing habits.

The advantages of the present invention include, without limitation, the enhanced shopping experience provided to shoppers materialized via intuitive navigation and ease of shopping, reduced time required for shopping, tailored product offering and the ability to shop from a remote location while leveraging collaboration through recipe purchasing.

The enhanced shopping experience arises from the fact that the disclosed invention does not pretend to exactly replicate real store experience by virtualizing it in three dimensions. Neither does the invention look to replicate typical store product arrangement within aisles, which are cluttered with products due to inventory requirements. This invention avoids the intrinsic problems of real storefronts altogether by constantly presenting store aisles through the interface. The shopper need not physically or virtually 'walk' from one aisle to the next, and is constantly looking at products, therefore significantly increasing the likelihood of purchase. Shoppers will quickly flick through aisles of products with image and text preloaded to their portable devices, enabling responsiveness far superior than any previous attempt at virtual shopping. The intuitiveness of the shopping experience proposed in this invention, where shoppers view products placed in shelves, touch the desired product and quickly through them it into the basket, is so simple and resembles actual shopping to an extent that it does not require previous training. Speed is a significant benefit of the disclosed invention, as shoppers are consistently viewing aisles, reducing shopping time, and quickly throwing the items they need into the basket as they would if they were rushing to shop at a regular store.

The current disclosure has been exemplified mainly around food, grocery and recipe shopping, but its applicability reaches far beyond these industries extending to all form of retailing that can include but are not limited to, toys, medicine, hardware, clothes, designs, office supplies, books, home and garden, beauty products, digital products, and/or any set of goods that can be showcased in aisle displays of different shapes and forms While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A produce and packaged goods vending method, comprising:

converting a vendor's product portfolio into a digital two-dimensional display of a plurality of store aisles, wherein the two-dimensional display is customized to each user based on a demographic of the user, a purchasing history of the user, or combinations thereof, wherein each store aisle includes a plurality of shelves, wherein each shelf includes a plurality of products from the vendor's product portfolio, wherein each of the first plurality of products is associated with a first position;

displaying the two-dimensional display of a first store aisle associated with a first plurality of products on a user interface of an electronic devices with touch-screen capabilities;

receiving a user communication including a user selected product of at least one of the first plurality of products, wherein the user communication includes touching the user interface of the electronic device at the first position associated with the user selected product;

upon receipt of the user communication, automatically providing for purchase one or more recipes that include the user selected product as an ingredient, wherein upon purchase each recipe identifies all products needed to complete the recipe; and communicating the user selected product to a vendor associated with the vendor's product portfolio for purchasing.

2. The method of claim 1 further comprising displaying a second store aisle on a user interface after displaying the first store aisle, wherein the second store aisle includes a second plurality of shelves, wherein each shelf includes a second plurality of products from the vendor's product portfolio, wherein the second plurality of products is different than the first plurality of products.

3. The method of claim 1 wherein, upon receiving the user communication, displaying the user selected product user selected product user selected product move from the first position associated with the user selected product to a second position associated with a virtual grocery basket.

4. The method of claim 1, wherein, upon receiving the user communication, displaying the user selected product through a plurality of positions on the user interface from the first position associated with the user selected product to a second position associated with a grocery basket, wherein the grocery basket is positioned below the plurality of shelves.

5. The method of claim 1, wherein, upon receiving the user communication, displaying the user selected product through a plurality of positions on the user interface from the first position associated with the user selected product to a second position associated with a grocery basket, wherein the grocery basket is positioned below the plurality of shelves, wherein the user communication does not include dragging the user selected product from the first position associated with the user selected product into the grocery basket.

6. The method of claim 1 further comprising maintaining a packaged goods vendor at a physical location, wherein the packaged goods vendor includes the vendor's product portfolio organized on a plurality of physical shelves, wherein the virtual two dimensional display of the store aisle including the plurality of shelves matches the plurality of physical shelves.

7. The method of claim 1 wherein the two dimensional display of the plurality of products is selected from a plurality of purchased products, wherein the plurality of purchased products includes at least one of a previous product purchase of the user.

8. The method of claim 1 wherein the two dimensional display of the plurality of products is associated with a demographic information associated with the user.

9. The method of claim 1, further comprising receiving a rating associated with the purchased recipe.

10. The method of claim 1, further comprising receiving a proposed edit associated with the purchased recipe.

11. The method of claim 1, further comprising displaying all the products needed to complete the purchased recipe, wherein each product can be individually selected for purchasing.

12. The method of claim 1, further comprising displaying all the products needed to complete the purchased recipe, wherein all the products needed to complete the purchased recipe can be collectively selected for purchasing.

* * * * *